United States Patent [19]
Kunze et al.

[11] Patent Number: 6,091,585
[45] Date of Patent: Jul. 18, 2000

[54] MAGNETIC-TAPE-CASSETTE APPARATUS WITH LATCHED HEAD PLATE

[75] Inventors: Norbert Kunze, Diez; Stefan Koch, Bad Endbach, both of Germany

[73] Assignee: U.S. Philips Corporation, New York, N.Y.

[21] Appl. No.: 09/054,107

[22] Filed: Apr. 2, 1998

[30] Foreign Application Priority Data

Apr. 5, 1997 [DE] Germany .................. 197 14 113

[51] Int. Cl.⁷ .................................................. G11B 5/54
[52] U.S. Cl. ............................................................. 360/251
[58] Field of Search ............................. 360/96.5, 105

[56] References Cited

U.S. PATENT DOCUMENTS

| | | | |
|---|---|---|---|
| 4,408,237 | 10/1983 | Takahashi et al. | 360/105 |
| 5,105,320 | 4/1992 | Hayashi | 360/105 |
| 5,132,863 | 7/1992 | Kakizaki | 360/137 |
| 5,331,484 | 7/1994 | Klos-Hein et al. | 360/96.5 |

FOREIGN PATENT DOCUMENTS 2208743  12/1989  United Kingdom.

*Primary Examiner*—Robert S. Tupper
*Attorney, Agent, or Firm*—David R. Treacy

[57] ABSTRACT

The invention relates to a magnetic-tape-cassette apparatus having a loading mechanism for loading the magnetic-tape cassette from an eject position into a play position and having a magnetic head transport mechanism for moving a magnetic head. To guarantee a trouble-free operation of the magnetic head transport mechanism latching means have been provided in order to latch the magnetic head transport mechanism in dependence upon the position of the loading mechanism.

8 Claims, 4 Drawing Sheets

MAGNETIC-TAPE-CASSETTE APPARATUS WITH LATCHED HEAD PLATE

BACKGROUND OF THE INVENTION

The invention relates to a magnetic-tape-cassette apparatus comprising a loading mechanism for loading the magnetic-tape cassette from an eject position into a play position and comprising a magnetic head transport mechanism for moving a magnetic head.

Magnetic-tape-cassette apparatuses are known which comprise a loading mechanism which transfers the magnetic-tape cassette from an eject position, in which the cassette can be removed by a user, into a play position. In the play position the reel discs of the magnetic-tape-cassette apparatus are in engagement with the reel hubs of the magnetic-tape cassette. For moving the magnetic head these magnetic-tape-cassette apparatuses often have a carrier plate which is pivotably supported on a chassis plate and which carries the magnetic head. The magnetic head can be moved towards and away from the magnetic tape of the magnetic-tape cassette in that the carrier plate is pivoted. A rotatable cam disc having a cam profile serves for pivoting the carrier plate and, as it is rotated, acts upon a follower pin mounted on the carrier plate and thus rotates the carrier plate.

During mounting when such a magnetic-tape-cassette apparatus is manufactured or as a result of vibrations during operation of the magnetic tape it may happen that the cam disc is rotated and the magnetic head is moved into the play position although the magnetic-tape cassette is not in the play position. This may result in damage to the magnetic-tape-cassette apparatus.

SUMMARY OF THE INVENTION

It is an object of the invention to provide a magnetic-tape-cassette apparatus of the type defined in the opening paragraph, which precludes the afore-mentioned malfunctions of the magnetic head transport mechanism.

According to the invention this object is achieved in that there have been provided latching means for latching the magnetic head transport mechanism in responsive to the position of the loading mechanism.

When the loading mechanism is not in the play position the latching means lock the magnetic head transport mechanism and thus prevent an undesired movement of the magnetic head from a non-operating position.

On the other hand, when the loading mechanism is in the play position, i.e. the magnetic-tape cassette has been lowered onto the reel discs, the latching means are released and allow the magnetic head transport mechanism to move the magnetic head towards the magnetic tape of the magnetic-tape cassette for the purpose of playing.

This guarantees a trouble-free operation of the magnetic head transport mechanism.

An advantageous embodiment of the invention is characterized in that the magnetic head transport mechanism comprises a drivable cam disc having a cam profile, and the latching means are adapted to latch the cam disc.

Such a drivable cam disc is prone to be rotated during mounting or as a result of vibrations during operation and can thus give rise to malfunctioning of the magnetic head transport mechanism. In the case of magnetic head transport mechanisms having a drivable cam disc it is therefore particularly advantageous if the latching means act directly upon the cam disc.

A further advantageous embodiment of the invention is characterized in that the loading mechanism comprises a transport rod which is drivable by a transport wheel, and the transport rod is adapted to unlatch the latching means.

The transport rod has different positions in the play position of the loading mechanism and in the eject position of the loading mechanism. In the eject position of the loading mechanism the transport rod does not act upon the latching means. In the play position of the loading mechanism the transport rod releases the latching means and thus liberates the magnetic head transport mechanism.

Since the transport rod forms part of the loading mechanism no additional actuating means are required for unlatching the latching means. This greatly simplifies the construction.

A further advantageous embodiment of the invention is characterized in that the latching means comprise a latching spring having a latching nose, which blocks the magnetic head transport mechanism when the loading mechanism is not in the play position.

A latching spring having a latching nose can be realized very simply and at low cost.

A further advantageous embodiment of the invention is characterized in that the latching nose of the latching spring engages a recess in the cam disc when the loading mechanism is not in the play position.

When the loading mechanism is not in the play position the latching nose of the latching spring engages the recess in the cam disc under the influence of the spring force and prevents the cam disc from being rotated, for example as a result of vibrations, and thereby causing an undesired movement of the magnetic head.

A further advantageous embodiment of the invention is characterized in that in the play position the transport rod of the loading mechanism urges the latching spring out of the recess in the cam disc in such a manner that the cam disc is unlatched.

Such an actuation of the latching spring is simple to realize because the transport rod of the loading mechanism is present anyway. In the play position the transport rod urges the latching spring out of the recess in the cam disc, while in the other positions of the loading mechanism, for example the eject position and further intermediate positions, the transport rod does not act upon the latching spring and the latching nose of the latching spring is urged into the recess in the cam disc under the influence of the spring force.

A further advantageous embodiment of the invention is characterized in that the cam disc is constructed as a toothed wheel having a toothed rim, and in an angular zone the toothed rim has a groove adapted to be engaged by the latching nose of the latching spring when the loading mechanism is not in the play position.

Such a construction is compact and does not require an additional latching groove or latching catch in the inner area of the cam disc.

The magnetic-tape-cassette apparatus in accordance with the invention can be used advantageously in a car radio and also in a vehicle.

Some diagrammatically shown embodiments of the invention win now be described in more detail, by way of examples, with reference to FIGS. 1 to 4 of the drawings.

DESCRIPTION OF THE PREFERRED EMBODIMENTS

Figure 1:
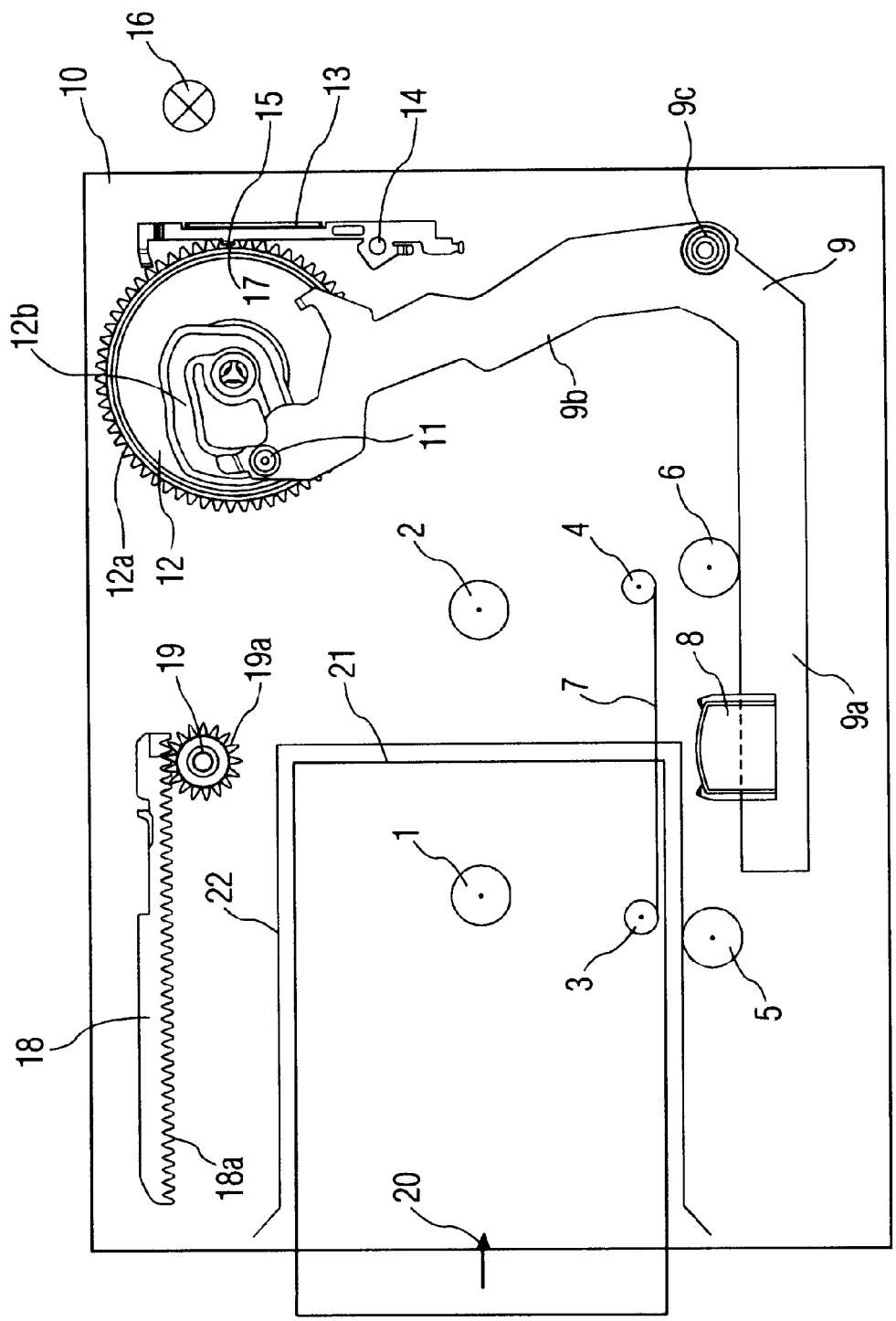
FIG. 1 is a diagrammatic plan view of a magnetic-tape-cassette apparatus having a magnetic head transport mechanism which comprises a cam disc, a latching spring for the cam disc and a transport rod of a loading mechanism, not shown, the transport rod of the loading mechanism and the magnetic head transport mechanism being shown in an eject position and the cam disc being latched by the latching spring.

FIG. 1 is a diagrammatic plan view showing a magnetic-tape-cassette apparatus in an eject position. It comprises a first reel disc 1, a second reel disc 2, a first capstan 3 and a second capstan 4. The first reel disc 1, the second reel disc 2, the first capstan 3 and the second capstan 4 are rotationally drivable by means of drive mechanisms, not shown. The first reel disc 1 and the second reel disc 2 are engageable in reel hubs, not shown, of a magnetic-tape cassette 21. A first pressure roller S and a second pressure roller 6 have been provided. The first pressure roller 5 can be applied to the first capstan 3 and the second pressure roller 6 can be applied to the second capstan 4 by means of a pressure-roller mechanism, not shown.

A magnetic head 8 is arranged on a magnetic head mounting plate 9 in a manner not shown. The magnetic head 8 can be mounted on the magnetic head mounting plate 9 so as to be stationary, rotatable or slidable. The magnetic head mounting plate 9 has a first limb 9a and a second limb 9b. The magnetic head mounting plate 9 is supported on a chassis plate 10 in a transitional area between the first limb 9a and the second limb 9b so as to be pivotable about a pivot 9c. The end of the second limb 9b of the magnetic head mounting plate 9 carries a follower pin 11. A cam disc 12 is rotatably supported on the chassis plate 10 and is rotationally drivable by a drive mechanism, not shown. The cam disc 12 has a toothed rim on its circumference and has a cam profile 12b in its inner area. The follower pin 11 engages the cam profile 12b of the cam disc 12. When the cam disc 12 is rotated the cam profile 12b acts upon the follower pin 11 of the magnetic head mounting plate 9 in such a manner that the magnetic head 8 carried by the magnetic head mounting plate 9 can be pivoted towards or away from the connecting line 7 between the first capstan 3 and the second capstan 4. A latching spring 13 has one end secured to a point of attachment 14 on the chassis plate 10. The latching spring 13 is a blade spring and has a latching nose 15. The spring force of the latching spring 13 acts essentially in a vertical direction 16. This spring force of the latching spring 13, which force acts in the vertical direction 16, urges the latching nose 15 into a groove 17 in the cam disc 12, as a result of which the cam disc 12 is locked against rotation in the eject position of the loading mechanism, which position is shown in FIG. 1.

A loading mechanism of the magnetic-tape-cassette apparatus, which mechanism is not shown any further, comprises a transport rod 18, shown diagrammatically in FIG. 1 and having transport rod teeth 18a, which transport rod 18 is supported on the chassis plate 10 so as to be movable in a horizontal direction 20 by means of a transport wheel 19 having transport wheel teeth 19a. The transport rod 18 serves for moving parts, not shown, of the loading mechanism, particularly for moving a cassette holder 11, which is adapted to receive the magnetic-tape cassette 21. During the loading operation the cassette holder 22 with the magnetic-tape cassette 21 is initially moved in the horizontal direction 20 and is subsequently lowered in the vertical direction 16, as a result of which the reel hubs of the magnetic-tape cassette engage with the first reel disc 1 and the second reel disc 2. A loading mechanism of this type is described in more detail in DE 196 09 790.

In the eject position of the magnetic-tape-cassette apparatus, which position is shown in FIG. 1, the magnetic-tape cassette 21 extends partly beyond the chassis plate 10 and can be removed by hand by a user. The transport rod 18 does not act upon the latching spring 13 in the eject position shown in FIG. 1.

Figure 2:
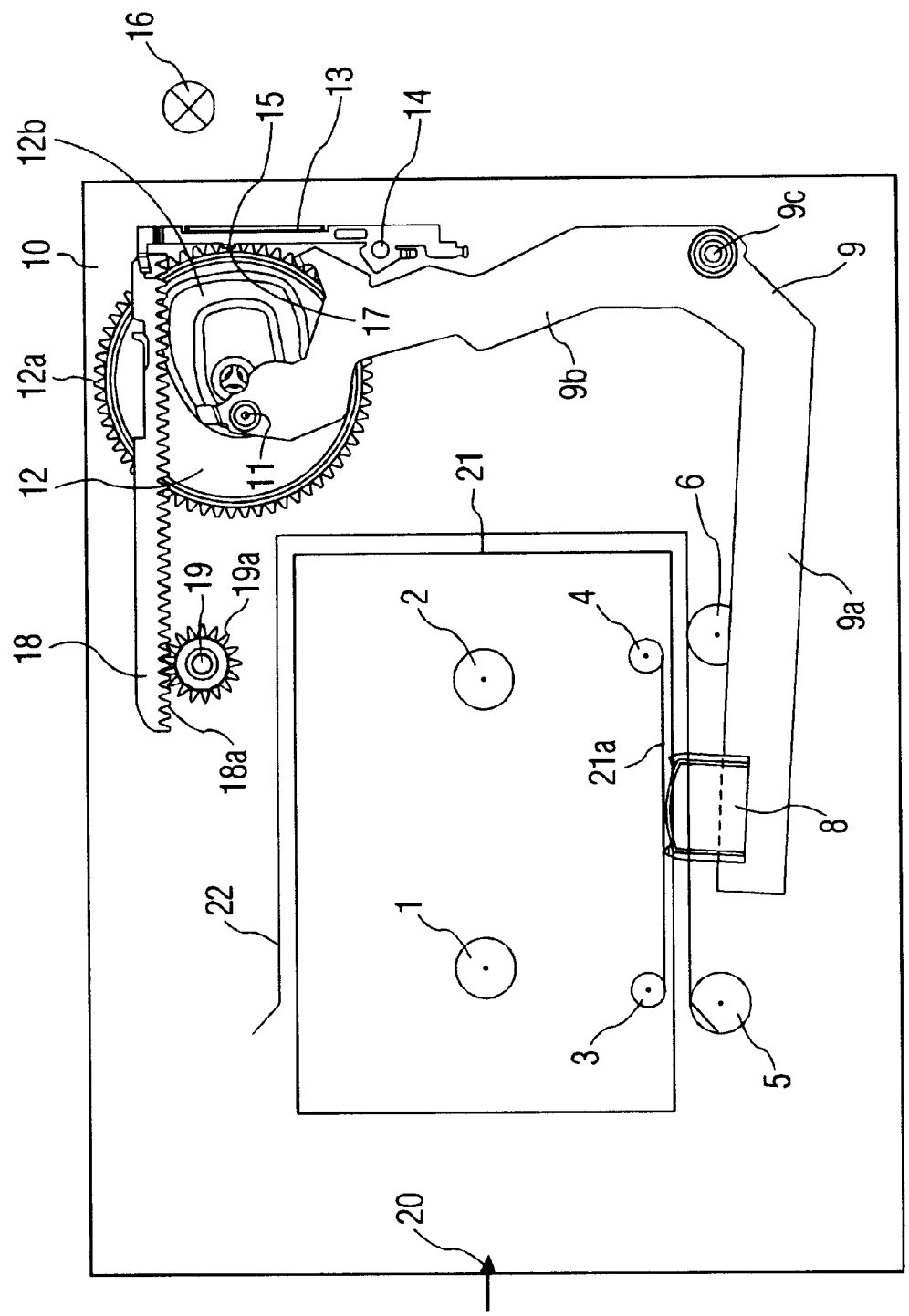
FIG. 2 is a diagrammatic plan view of a magnetic-tape-cassette apparatus shown in FIG. 1, the transport rod of the loading mechanism and the magnetic head transport mechanism being shown in a play position and the latching spring being unlatched by the transport rod.

FIG. 2 is a diagrammatic plan view showing parts of the magnetic-tape-cassette apparatus in the play position. With respect to the eject position shown in FIG. 1 the transport rod 18 has been moved in the horizontal direction 20 towards the latching spring 13 by rotation of the transport wheel 19 and urges the latching spring 13 upward in the vertical direction 16, as a result of which the latching nose 15 of the latching spring 13 is urged out of the groove 17 in the cam disc 12. The transport rod 18 has also moved the entire loading mechanism, which is not shown any further, from the eject position into the play position, as a result of which the cassette holder 22 with the magnetic-tape cassette has initially been moved in the horizontal direction and has subsequently been lowered in the vertical direction 16 onto the first reel disc 1 and the second reel disc 2. The cam disc 12 is latched in the play position and has been rotated clockwise by means of the drive mechanism, not shown, as a result of which the cam profile 12b has acted upon the follower pin 11 of the magnetic head mounting plate 9 in such a manner that this plate has also moved in a clockwise direction towards the magnetic-tape cassette 21 and the magnetic head 8 is pressed against the magnetic tape 21a of the magnetic-tape cassette 21 in order to be played.

Figure 3:
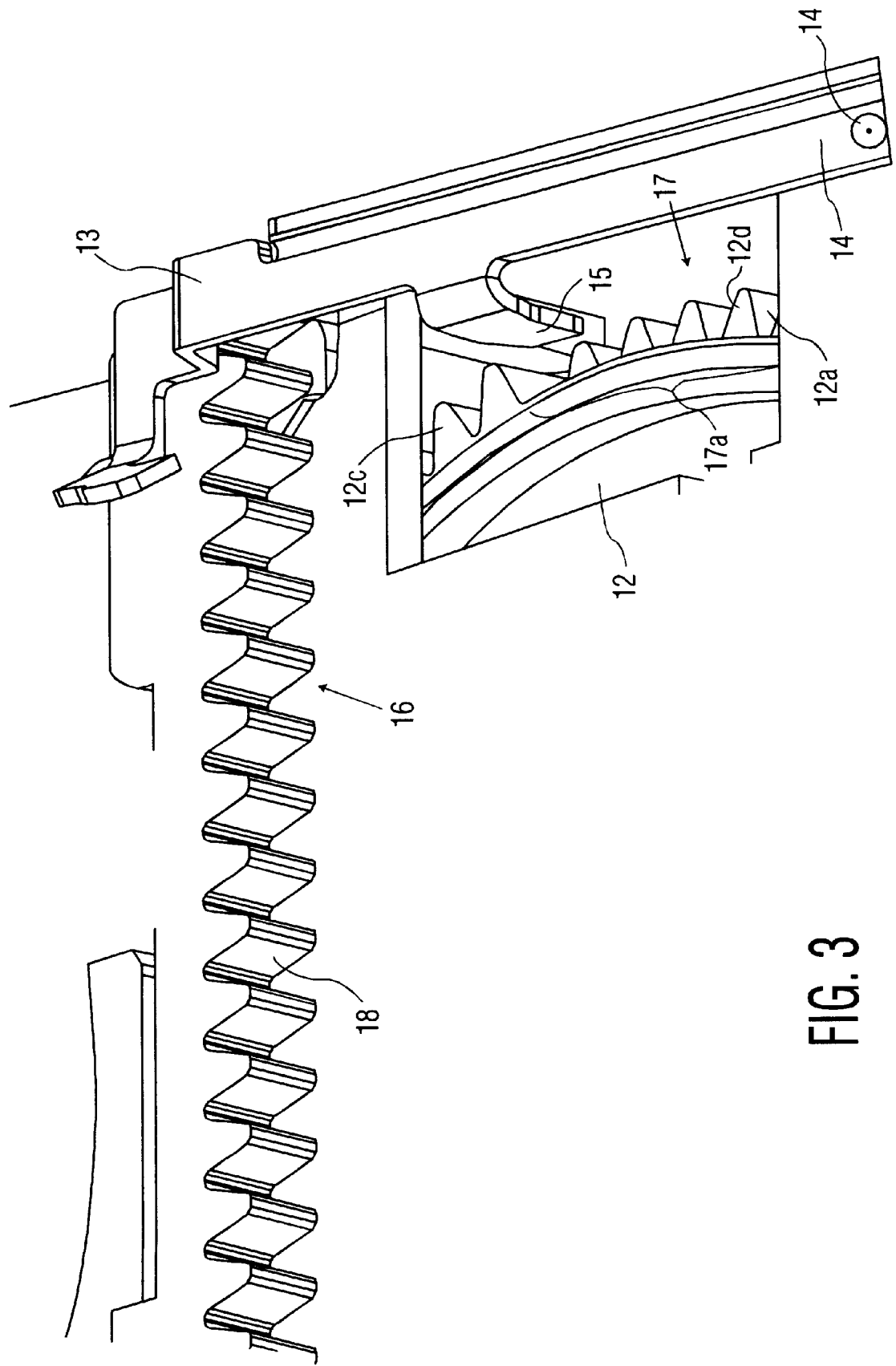
FIG. 3 is an enlarged-scale perspective view showing the transport rod and the latching spring in the play position, the latching spring being pushed up by the transport rod as a result of which the latching nose of the latching spring releases the cam disc.

FIG. 3 is an enlarged-scale perspective view showing the transport rod 18, the latching spring 13 with the latching nose 15 as well as the cam disc 12 in the play position of the loading mechanism of FIG. 2. From FIG. 3 it is apparent that transport rod 18 urges the latching spring 13, which is secured to the point of attachment 14, upward in the vertical direction 16, as a result of which the latching nose 15 of the latching spring 13 is urged out of the groove 17 in the cam disc 12. In FIG. 3 the toothed rim 12a of the cam disc 12 has teeth 12c outside an angular zone 17a of the groove 17 and has teeth 12d inside the angular zone 17a of the groove 17. In the vertical direction 16, i.e. in the axial direction of the cam disc 12, the teeth 12d of the toothed rim 12a have a smaller height than the teeth 12c. Thus, the groove 17 is formed by the difference in height between the teeth 12c and 12d.

Figure 4:
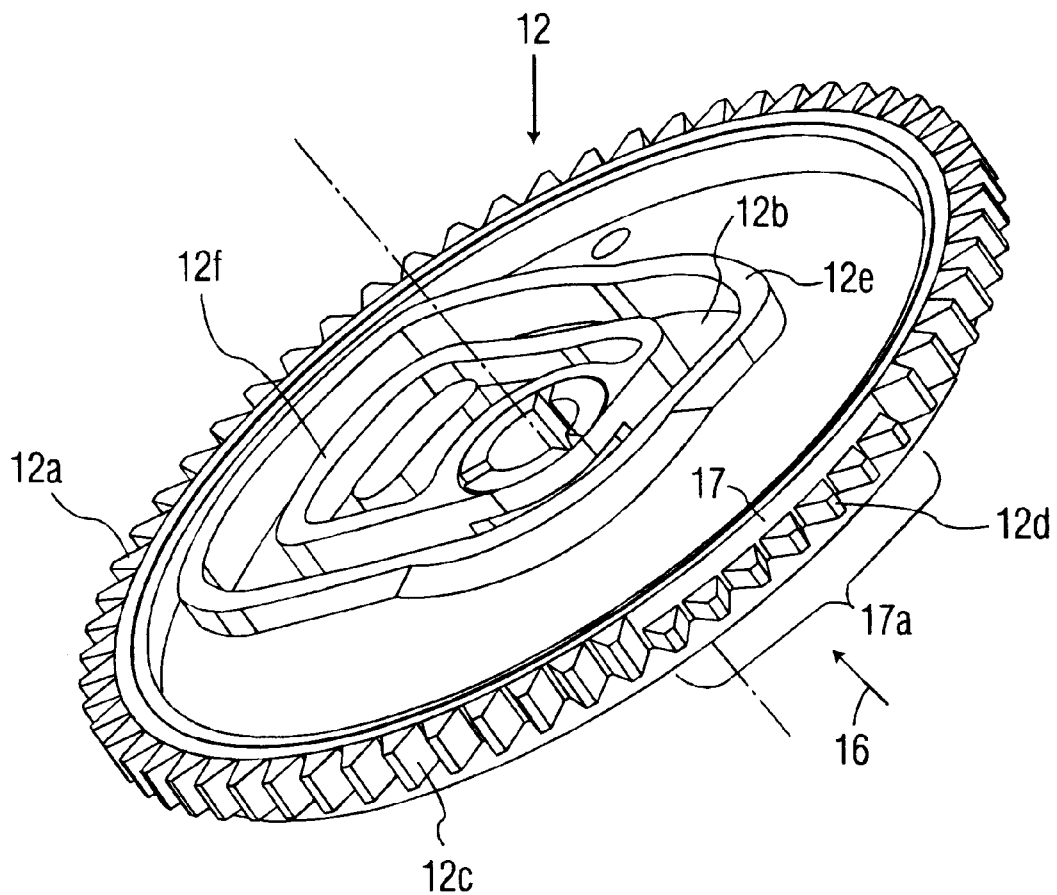
FIG. 4 is a perspective view of the cam disc with a cam profile, the cam disc having a toothed rim with a groove adapted to receive the latching nose of the latching spring.

FIG. 4 is a perspective view of the cam disc 12 shown in FIGS. 1 to 3. The cam disc 12 has the toothed rim 12a comprising the teeth 12c outside the angular zone 17a and the teeth 12d inside the angular zone 17a. In the vertical direction, i.e. in the axial direction of the cam disc 12, the teeth 12d inside the angular zone 17a have a smaller height than the teeth 12c outside the angular zone 17a. Thus, the groove 17 is formed in the toothed rim 12a of the cam disc 12, in which groove the latching nose 15 of the latching spring 13 shown in FIGS. 1 to 3 is engageable. The cam disc 12 has a cam profile 12b defined by a first cam wall 12e and a second cam wall 12f.

What is claimed is:

1. A magnetic-tape-cassette apparatus comprising:

a loading mechanism for loading a magnetic-tape cassette, said loading mechanism being movable from an eject position to a play position, a magnetic head, and a magnetic head transport mechanism for moving said head toward a cassette in the play position, or to a non-operating position, characterized in that the magnetic head transport mechanism comprises a rotatable disc having a cam profile, the apparatus further comprises a latch for latching the magnetic head transport mechanism when the loading mechanism is in the eject position, and a mechanism operated by the loading mechanism for unlatching the latch when the loading mechanism is in the play position, and the latch prevents rotation of the disc.

2. An apparatus as claimed in claim 1, characterized in that the loading mechanism comprises a cassette holder, a transport rod for moving the cassette holder, and a transport wheel for moving the transport rod, movement of the transport rod unlatching the latch upon movement of the loading mechanism to the play position.

3. An apparatus as claimed in claim 1, characterized in that the latch comprises a latching spring having a latching nose arranged to engage the magnetic head transport mechanism under spring force when the loading mechanism is not in the play position.

4. An apparatus as claimed in claim 3, characterized in that engagement of the disc by the latching nose prevents rotation of the disc.

5. An apparatus as claimed in claim 4, characterized in that the disc has a recess engaged by the latching nose to latch the disc.

6. A magnetic-tape-cassette apparatus comprising:

a loading mechanism for loading a magnetic-tape cassette, said loading mechanism being movable from an eject position to a play position, a magnetic head, and a magnetic head transport mechanism for moving said head toward a cassette in the play position, or to a non-operating position, characterized in that the magnetic head transport mechanism comprises a rotatable disc having a cam profile, the apparatus further comprises a latch for latching the magnetic head transport mechanism when the loading mechanism is in the eject position, and a mechanism operated by the loading mechanism for unlatching the latch when the loading mechanism is in the play position, the latch comprises a latching spring having a latching nose arranged to engage the disc under spring force to prevent rotation of the disc when the loading mechanism is not in the play position, and the loading mechanism comprises a cassette holder, a transport rod for moving the cassette holder, and a transport wheel for moving the transport rod, movement of the transport rod moving the latching nose out of engagement with the disc upon movement of the loading mechanism to the play position.

7. An apparatus as claimed in claim 6, characterized in that the disc has a recess engaged by the latching nose to latch the disc, and the transport rod moves the latching nose out of the recess.

8. An apparatus as claimed in claim 7, characterized in that the disc is a toothed wheel having a toothed rim, and the recess is a groove in an angular zone of the toothed rim.

* * * * *